United States Patent
Ivashin

(10) Patent No.: US 8,368,803 B2
(45) Date of Patent: Feb. 5, 2013

(54) SETTING EXPOSURE ATTRIBUTES FOR CAPTURING CALIBRATION IMAGES

(75) Inventor: Victor Ivashin, Danville, CA (US)

(73) Assignee: Seiko Epson Corporation, Tokyo (JP)

( * ) Notice: Subject to any disclaimer, the term of this patent is extended or adjusted under 35 U.S.C. 154(b) by 673 days.

(21) Appl. No.: 12/557,180

(22) Filed: Sep. 10, 2009

(65) Prior Publication Data

US 2011/0058098 A1 Mar. 10, 2011

(51) Int. Cl.
*G03B 7/00* (2006.01)
*H04N 5/235* (2006.01)

(52) U.S. Cl. ........ 348/362; 348/180; 348/187; 348/744; 348/745

(58) Field of Classification Search ................. 348/362, 348/180, 187
See application file for complete search history.

(56) References Cited

U.S. PATENT DOCUMENTS

| | | | |
|---|---|---|---|
| 6,804,406 B1* | 10/2004 | Chen | 382/254 |
| 6,939,011 B2* | 9/2005 | Kobayashi | 353/69 |
| 7,038,727 B2 | 5/2006 | Majumder et al. | |
| 7,517,089 B2* | 4/2009 | Matsuda | 353/69 |
| 7,661,827 B2* | 2/2010 | Matsuda | 353/69 |
| 8,035,688 B2* | 10/2011 | Snyderman et al. | 348/187 |
| 8,102,332 B2* | 1/2012 | Nelson et al. | 345/1.1 |
| 8,144,241 B2* | 3/2012 | Nemoto | 348/365 |
| 8,262,229 B2* | 9/2012 | Nelson | 353/94 |
| 2005/0001986 A1* | 1/2005 | Matsuda | 353/31 |
| 2006/0126134 A1* | 6/2006 | Bala et al. | 358/504 |
| 2007/0027504 A1 | 2/2007 | Barrett et al. | |
| 2007/0091201 A1* | 4/2007 | Sasaki | 348/362 |
| 2007/0171380 A1 | 7/2007 | Wright et al. | |
| 2009/0027523 A1* | 1/2009 | Chang et al. | 348/254 |
| 2009/0115915 A1* | 5/2009 | Steinberg et al. | 348/745 |
| 2009/0273680 A1* | 11/2009 | Palum | 348/187 |

FOREIGN PATENT DOCUMENTS

| | | |
|---|---|---|
| JP | 2006-108988 | 4/2006 |
| JP | 2006-135381 | 5/2006 |

\* cited by examiner

*Primary Examiner* — Jason Chan
*Assistant Examiner* — Cynthia Segura

(57) ABSTRACT

In an example embodiment, a calibration module in a projector platform establishes an initial configuration of settable exposure attributes for a digital camera. The calibration module projects a preview image onto a surface and captures the projection of the preview image with the digital camera and receives input from a user identifying regions of interest in the capture of the preview image. Next the calibration module projects an exposure image onto the surface. The calibration module then computes a final configuration of exposure attributes for the digital camera by iteratively: (a) capturing the projection of the exposure image with the digital camera; (b) measuring descriptive statistics relating to the color channels of pixels in the regions of interest in the capture of the exposure image; (c) evaluating the descriptive statistics with an evaluation function determined by a calibration process; and (d) establishing a revised configuration of exposure attributes.

21 Claims, 7 Drawing Sheets

| SUPER-BRIGHT | SUPER-BRIGHT PRECISION | PERFORMANCE | PRECISION |
|---|---|---|---|
| RED_IMAGE GREEN_IMAGE BLUE_IMAGE AMBIENT_IMAGE HOMOGRAPHY_IMAGE | RED_IMAGE GREEN_IMAGE BLUE_IMAGE AMBIENT_IMAGE AMBIENT_IMAGE_RED AMBIENT_IMAGE_GREEN AMBIENT_IMAGE_BLUE AMBIENT_IMAGE_GRAY AMBIENT_IMAGE_RASTER_ROWS AMBIENT_IMAGE_RASTER_COLUMNS GRAY_IMAGE RASTER_IMAGE_ROWS RASTER_IMAGE_COLUMNS RASTER_IMAGE_BOX | WHITE_IMAGE GRAYSCALE_IMAGE REDSCALE_IMAGE GREENSCALE_IMAGE BLUESCALE_IMAGE RED_IMAGE GREEN_IMAGE BLUE_IMAGE AMBIENT_IMAGE HOMOGRAPHY_IMAGE | WHITE_IMAGE GRAYSCALE_IMAGE REDSCALE_IMAGE GREENSCALE_IMAGE BLUESCALE_IMAGE RED_IMAGE GREEN_IMAGE BLUE_IMAGE AMBIENT_IMAGE AMBIENT_IMAGE_RED AMBIENT_IMAGE_GREEN AMBIENT_IMAGE_BLUE AMBIENT_IMAGE_GRAY AMBIENT_IMAGE_RASTER_ROWS AMBIENT_IMAGE_RASTER_COLUMNS GRAY_IMAGE RASTER_IMAGE_ROWS RASTER_IMAGE_COLUMNS RASTER_IMAGE_BOX |

SETTING EXPOSURE ATTRIBUTES FOR CAPTURING CALIBRATION IMAGES

BACKGROUND

Typically, exposure settings for a commodity digital camera include three attributes capable of adjustment: (1) aperture; (2) shutter speed; and (3) ISO setting. The aperture is a unit of measurement that determines the size of the opening in a digital camera's lens. The larger the aperture, the greater the amount of light that passes through the lens to the camera's digital sensor. The shutter speed is a unit of measurement that determines how long a digital camera's shutter remains open as an image is captured by the camera. The slower the shutter speed, the longer the exposure time. The ISO setting is a unit of measurement of the light sensitivity of a camera's digital sensor. The higher the ISO setting, the more sensitive the digital sensor.

Presently, commodity digital cameras are available that automatically configure these exposure settings. However, such automatic exposures settings tend to fail to produce image captures of sufficient quality for some systems that include commodity digital cameras as automated components, including the system, described below, for creating a relatively seamless display from a number of commodity projectors. Of course, one could configure the exposure settings manually. However, satisfactory exposure settings often vary from image to image. Consequently, manual configuration of exposure settings would be a time-consuming and error-prone process.

SUMMARY

In an example embodiment, a calibration module in a projector platform includes a method whose first operation establishes an initial configuration of settable exposure attributes for a digital camera. In the next operation, the calibration module projects a preview image onto a surface. The calibration module captures the projection of the preview image with the digital camera and receives input identifying regions of interest in the capture of the preview image. Next the calibration module projects an exposure image onto the surface. The exposure image is related to one or more calibration images (or test patterns) through a calibration process. The calibration module then computes a final configuration of exposure attributes for the digital camera by iteratively: (a) capturing the projection of the exposure image with the digital camera; (b) measuring descriptive statistics (e.g., maximum, minimum, median, and/or average) relating to the color channels of pixels in the regions of interest in the capture of the exposure image; (c) evaluating the descriptive statistics with an evaluation function determined by the calibration process; and (d) establishing a revised configuration of exposure attributes for the digital camera. After the calibration module computes the final configuration of exposure attributes, the calibration module stores the final configuration for subsequent use by the projector platform when it displays the calibration images related to the exposure image.

These and other aspects and advantages of the claimed inventions will become apparent from the following detailed description, which taken in conjunction with the accompanying drawings, illustrates by way of example the principles of the inventions.

BRIEF DESCRIPTION OF THE DRAWINGS

FIG. 4 shows a table listing calibration images that might be used to calibrate a system for creating a relatively seamless display from a number of projectors, in accordance with an example embodiment.

DETAILED DESCRIPTION

In the following description, numerous specific details are set forth in order to provide a thorough understanding of the exemplary embodiments. However, it will be apparent to one skilled in the art that the example embodiments might be practiced without some of these specific details. In other instances, process operations and implementation details have not been described in detail, if already well known.

A method is described for determining the optimal exposure settings of a capture device, such as a digital camera, utilized by a calibration process to capture a set of calibration images for configuration of a multi-projector display system. The method includes a region identification interface, an automated capture of an exposure image, a measurement and evaluation function, and an exposure setting technique for reference by the system calibration processes. In the embodiments described below, multiple exposure images are captured and analyzed. One skilled in the art will appreciate that proper exposure of the exposure images has a direct impact on the quality of the captured content, which in turn feeds the processing and determines the results of the subsequent projector system calibration.

Figure 1:
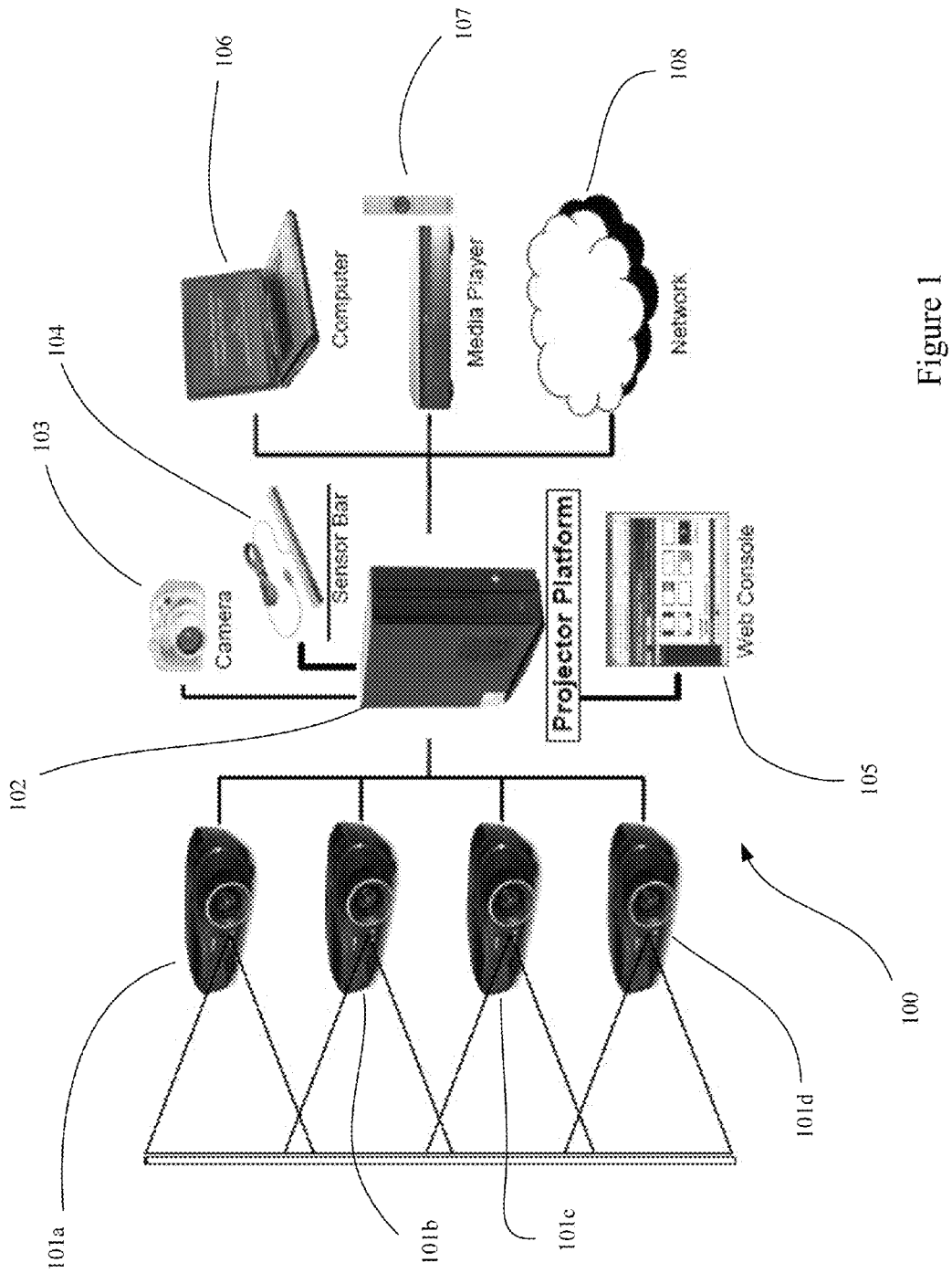
FIG. 1 is a schematic diagram of the hardware components for a system for creating a relatively seamless display from a number of projectors, in accordance with an example embodiment.

FIG. 1 is a schematic diagram of the hardware components for a system for creating a relatively seamless display from a number of projectors, in accordance with an example embodiment. In this embodiment, the system 100 includes a projector platform 102, which might be a general-purpose computer configured with a central processing unit (CPU) and a number of graphic processing units (GPUs), as well as memory, storage, and an operating system, such as a version of Linux® or Windows®. For example, the CPU might be an Intel® Quad-Core Q6600 microprocessor and the GPUs might be two graphics cards which conform to the Peripheral Component Interconnect Express (PCIe) standard, such as the NVIDIA® GeForce® 9800 GTX graphics cards. The two graphics cards allow the projector platform 102 to send video output for projection onto a surface to four video projectors, 101a, 101b, 101c, and 101d.

It will be appreciated that the example embodiments described herein might accommodate projection onto a flat surface or a surface that is irregular in terms of evenness. In an example embodiment, a digital still camera 103 (or a digital camera that is capable of taking a still photograph) is attached to projector platform 102 using USB (universal serial bus) cabling during calibration of the system 100. In alternative example embodiment, a digital video camera might be used for calibration of the system 100. Following calibration, the digital camera 103 might be removed. An optional capture card allows for video input to the projector platform 102 from a laptop 106, from a media player 107, and/or from a network 108, which might be a LAN (local area network), a WAN (wide area network), the Internet, etc. An optional sensor bar 104 allows for non-video input to the project platform 102, as does the web console 105, which might receive input from a keyboard and/or a mouse.

Figure 2:
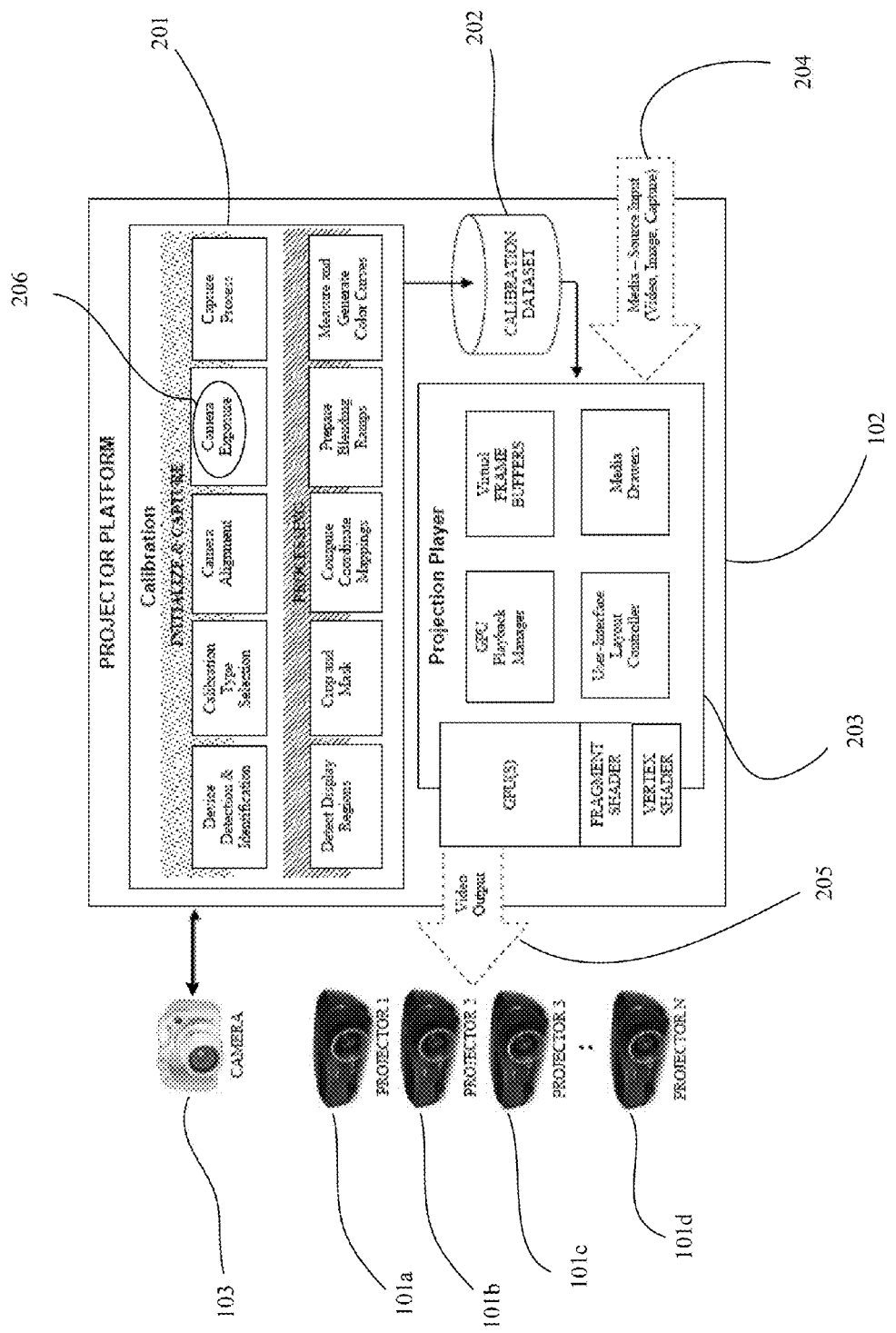
FIG. 2 is a schematic diagram of the high-level functional modules in a system for creating a relatively seamless display from a number of projectors, in accordance with an example embodiment.

FIG. 2 is a schematic diagram of the high-level functional modules in a system for creating a relatively seamless display from a number of projectors, in accordance with an example embodiment. In this embodiment, the projector platform 102 receives inputs 204 which are processed and then output as video 205 to video projectors 101a, 101b, 101c, and 101d. As depicted in this figure, the inputs 204 might be video, images, or captures (e.g., captured with frame-grabber hardware or over a network). The digital camera 103 also provides input in the form of captured calibration images to the projector platform 102.

As depicted in FIG. 2, the projector platform 102 executes two high-level modules, which might be software, firmware, and/or hardware: a calibration module 201 and a projection player 203. The calibration module 201 interfaces with the projection player 203 through the calibration dataset 202, which persistently stores the output of the calibration module 201 for subsequent use by the projection player 203. The calibration module 201 includes two groups of modules. The first group of modules generally pertains to initialization and capture and includes modules for: (1) device detection and identification; (2) calibration type selection; (3) camera alignment; (4) camera exposure; and (5) capture process. The second group of modules generally pertains to processing and includes modules to: (1) detect display regions; (2) crop and mask; (3) compute coordinate mappings; (4) prepare blending ramps; and (5) measure and generate color curves. All results output by calibration module 201 are stored in the calibration dataset 202. The module 206 (camera exposure) is the module in which the process for setting exposure attributes described below might execute, in an example embodiment. Other modules in the calibration module 201 might also be suitable for the execution of this process, in alternative example embodiments.

The projection player 203 takes as inputs the data stored in the calibration dataset 202 and the media 204. As depicted in FIG. 2, the projection player 203 includes the following modules: (1) a GPU playback manager; (2) virtual frame buffers; (3) a user-interface layout controller; and (4) media drawers. The projection player 203 interfaces with the system's GPUs, which execute a fragment shader and a vertex shader, in order to generate the adjusted video output 205 transmitted to the projectors 101a-101d for display on a surface.

Figure 3:
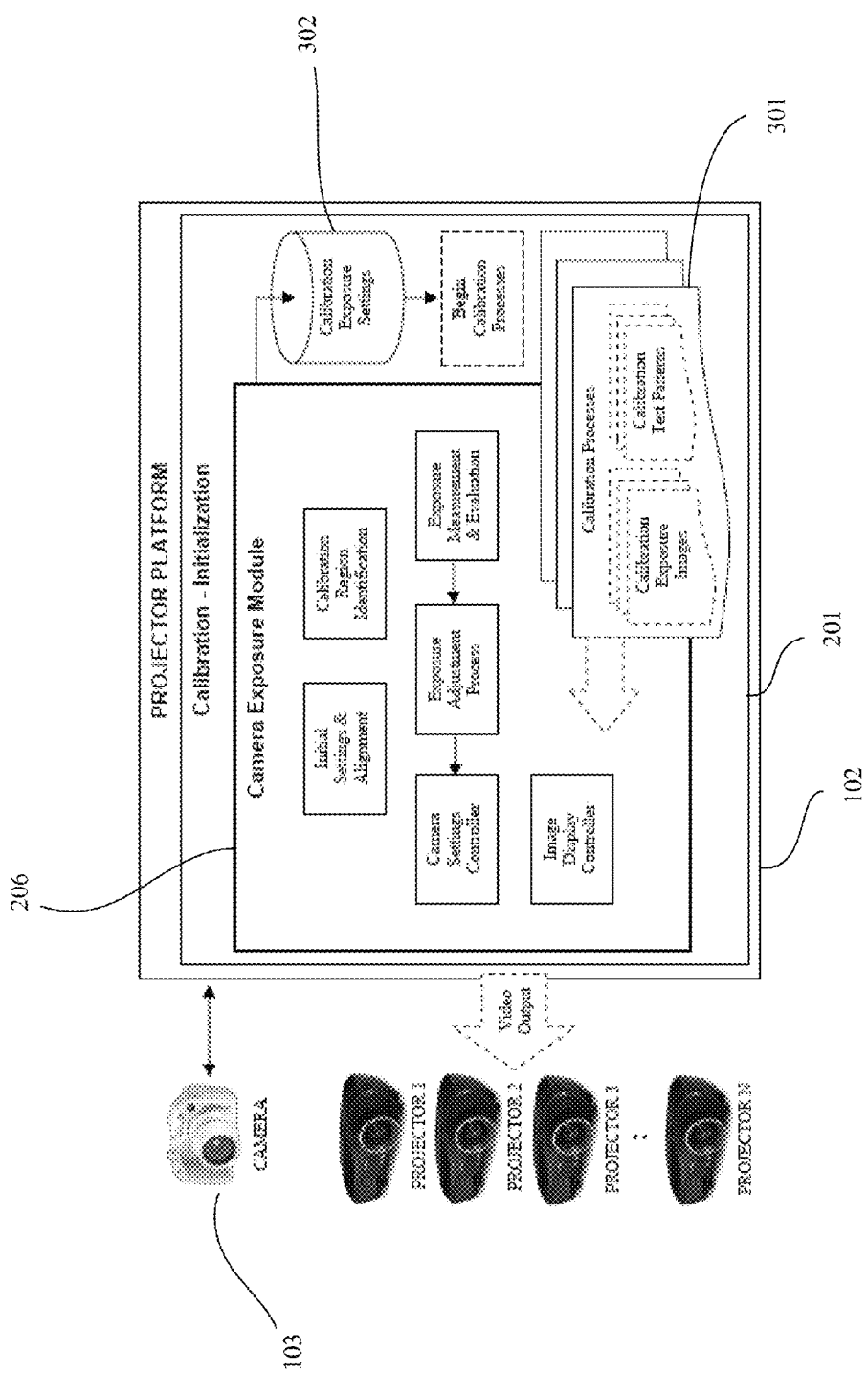
FIG. 3 is a schematic diagram of the functional components in a module for obtaining a configuration of exposure attributes for a calibration process, in accordance with an example embodiment.

FIG. 3 is a schematic diagram of the functional components in a module for obtaining a configuration of exposure attributes for a calibration process, in accordance with an example embodiment. In an example embodiment, projector platform 102 executes calibration and initialization module 201, which includes camera exposure module 206, as discussed earlier and as depicted in FIG. 2. Camera exposure module 206 takes as an input a calibration process 301, which might consist of a small number (e.g., four) of exposure images (e.g., a red image, a green image, a blue image, and/or a grayscale image). The exposure images might be associated with a larger number (e.g., ten) of calibration images. It will be appreciated that the relative numbers of exposure images and calibration images are exemplary and are not meant to be limiting. In an example embodiment, the calibration images for projector platform 102 might include patterns that are solid red, solid green, solid blue, solid white, multiple gradations of red, multiple gradations of green, multiple gradations of blue, alternating bands of blue/green stripes, and horizontal and vertical raster lines, among others. Camera exposure module 206 outputs calibration exposure settings 302, which are persistently stored (e.g., in a database) by the projector platform 102 for subsequent use by other modules in the calibration and initialization module 201, as discussed elsewhere.

FIG. 4 shows a table listing calibration image sets that might be used to calibrate a system for creating a relatively seamless display from a number of projectors, in accordance with an example embodiment. The column headings in the table 401 are calibration processes (e.g., calibration process 301 in FIG. 3) which might be used in an example embodiment, e.g., SUPER-BRIGHT, SUPER-BRIGHT PRECISION, PERFORMANCE, and PRECISION. The items listed under each column heading are calibration image sets, each set to be associated with one of an exposure image and its future calibrated exposure settings as defined by the calibration process. For example, under the column heading PRECISION is a calibration image set called RASTER_IMAGE_ROWS, which might consist of several calibration images of white horizontal raster lines drawn against a black background at known pixel densities and vertical offsets. An exposure image with a solid white pattern may be associated with the calibration images in this calibration image set. Also, under the same column heading is a calibration image set called RED_IMAGE, which might consist of a single calibration image with an area of color at known RGB (Red Green Blue) values for a red hue, in an example embodiment. It will be appreciated that the single calibration image in the RED_IMAGE calibration image set might also double as its own exposure image for purposes of setting the exposure attributes for the digital camera. Additionally, the solid white exposure image for calibration image set RASTER_IMAGE_ROWS might also be associated with the calibration images from the WHITE_IMAGE calibration image set in the PRECISION calibration process. In this way, the exposure setting determined by a single exposure image may be shared among several calibration images.

Figure 5:
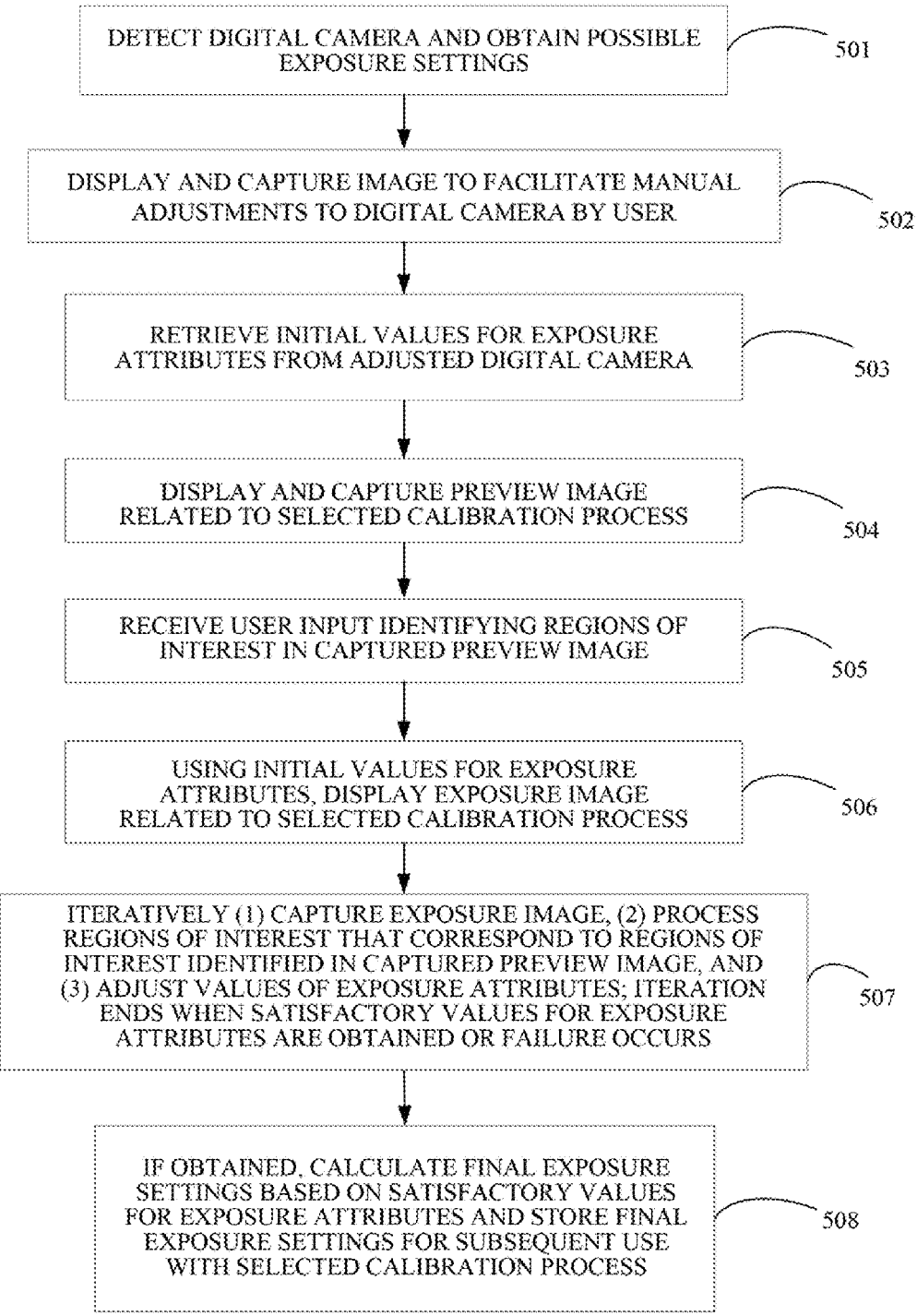
FIG. 5 is a flowchart diagram illustrating a process for obtaining a configuration of exposure attributes for a calibration process, in accordance with an example embodiment.

FIG. 5 is a flowchart diagram illustrating a process for obtaining a configuration of exposure attributes for a calibration process, in accordance with an example embodiment. This process might execute in calibration module 201 (e.g., in camera exposure module 206) on projector platform 102, as depicted in FIG. 3. Thus, the process might be made operable as software, firmware, and/or hardware. In the first operation 501 of the process shown in FIG. 5, the calibration module detects the projector platform's digital camera (e.g., a digital camera that is capable of taking still photographs) and obtains a list of the digital camera's possible exposure settings or attributes. It will be appreciated that an open-source software library such as libgphoto2 might be used to retrieve and/or set exposure settings (e.g., apertures, shutter speeds, and ISO settings) of a digital camera, in an example embodiment. In an example embodiment, the possible settings for an exposure attribute might be sorted so that an exposure direction is maintained. For example, shutter-speed settings might be enumerated from fast to slow so that a current exposure setting can be increased or decreased by simply adjusting an index position into a list of possible settings. Other exposure attributes might be handled by the calibration module in a similar manner. Here it will be appreciated that an aggregate exposure setting might be maintained (e.g., in volatile or persistent storage) by the calibration module, where the aggregate exposure setting is made up of a setting for the aperture, a setting for the shutter speed, a setting for the ISO setting, etc.

In the process's next operation 502, the calibration module displays and captures an image to facilitate manual adjustments to the digital camera by the user of the projection platform, either (a) directly or (b) remotely using interface controls. In an example embodiment, the user might select the image to be displayed. The manual adjustments might include adjustments to the digital camera's: (1) position and/or orientation; (2) field of view (e.g., zoom); (3) depth of field (e.g., aperture); (4) focus; (5) ISO setting; and (6) shutter speed. Alternatively, at this point in the process, the user might employ automation functionality provided by the digital camera, e.g., auto-focus or auto-exposure, rather than manual adjustments, which might be expensive in terms of time and effort. The image displayed in this operation might include grids or border elements to frame projector display regions. Alternatively, the image displayed in this operation might be related to a calibration process as described elsewhere in this disclosure, although any suitable image might be substituted. In an example embodiment, the image might be displayed on all of the projectors in the projector platform. In an alternative example embodiment, the image might be displayed on fewer than all of the projectors in the projector platform.

In operation 503 of the process, the calibration module retrieves (e.g., with software) the initial values for exposure attributes from the adjusted digital camera. In an alternative example embodiment, the calibration module might set initial values for the exposure attributes by picking a midpoint value in a sorted list of available exposure settings for each exposure attribute. In operation 504, the calibration module displays (e.g., on all projectors in the projector platform) and captures a preview image related to the selected calibration process, e.g., an image related to super-bright precision (as described above), if that is the calibration process that has been selected. In an example embodiment, the preview image might be an area of solid bright color. Or the preview image might be the same as an exposure image subsequently displayed by the calibration module. In operation 505, the calibration module receives user input identifying regions of interest in the captured preview image. In an example embodiment, the captured preview image might be converted into a grayscale image that allows a user to identify bright overlapping and dark non-overlapping areas across the visible display surface. By positioning a cursor on the captured preview image displayed in a dialog box in a graphical user interface (GUI) and clicking a mouse, a region of interest is denoted for the capture preview image. Each region of interest will be correlated with a respective region in the capture of subsequent exposure images. An alternative example embodiment might automate the identification of regions of interest. To avoid weighting in the statistical calculations described below, all of the regions capable of identification might be the same size. In an alternative example embodiment, a fixed size for the regions capable of identification might be received as an input from the user.

Still referring to FIG. 5, in operation 506, the calibration module displays (e.g., on all projectors in the projector platform) an exposure image (e.g., one associated with the RED_IMAGE calibration image set in FIG. 4) related to the selected calibration process, using the initial values for exposure attributes retrieved from the digital camera. In operation 507, the calibration process iteratively: (1) captures the exposure image; (2) processes (e.g., using the measuring and evaluation operations discussed further below) the captured image data for the regions of interest that correspond to the regions of interest identified by the user in the captured preview image; and (3) adjusts (e.g., with software) the values of exposure attributes using the available exposure settings. The iteration ends when satisfactory values for the exposure attributes are obtained or when failure occurs (e.g., all possible permutations of the exposure attributes have proven to be unsatisfactory). In an example embodiment, the calibration module might employ various sorting and searching algorithms such as Quicksort and binary search when adjusting the values of the exposure attributes using the available exposure settings. If satisfactory values for the exposure attributes cannot be obtained by the process, the process might report failure in an example embodiment, or alternatively, use default values for exposure attributes. If satisfactory values for the exposure attributes are obtained, the calibration module calculates final exposure settings (e.g., aperture, shutter speed, and/or ISO setting) based on the values and stores the final exposure settings for subsequent use with the selected calibration process, in operation 508. In an example embodiment, the calculation of the final exposure settings in operation 508 might involve the addition or subtraction of a specified amount (or other similar adjustment) to or from one or more of the satisfactory values, to cushion the final exposure settings against error. For example, one of the exposure images for a calibration image containing raster lines might be a full-screen, white image. However, when saving the final exposure settings for this exposure image, the calibration module might adjust the exposure setting for shutter speed upward by two stops to ensure that the thin, dimly-lit raster lines do not get too underexposed.

Figure 6:
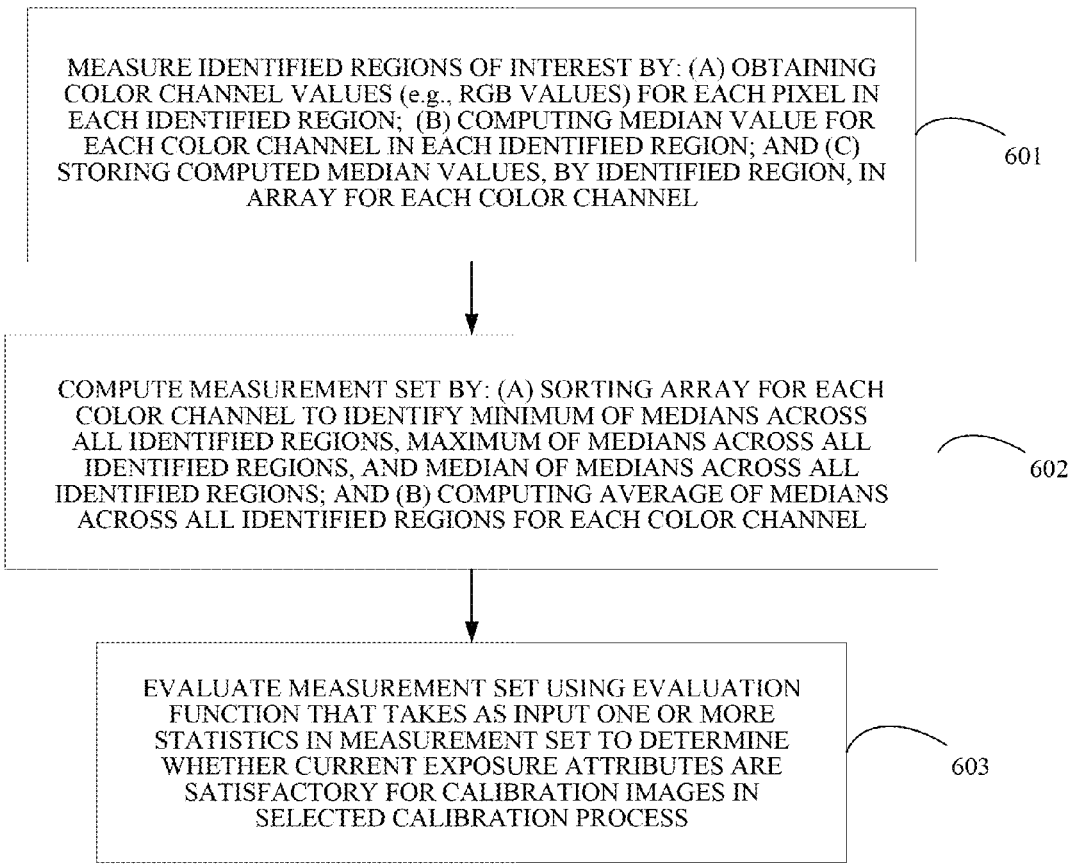
FIG. 6 is a flowchart diagram illustrating a process for evaluating the regions of interest identified by a user in a capture of an exposure image, in accordance with an example embodiment.

FIG. 6 is a flowchart diagram illustrating a process for evaluating the regions of interest identified by a user in a capture of an exposure image, in accordance with an example embodiment. This process also might execute in calibration module 201 (e.g., camera exposure module 206) on projector platform 102, as depicted in FIG. 3. This process might be part of the processing of regions of interest shown as operation 507 in FIG. 5. In the first operation 601 of the process shown in FIG. 6, the calibration module analyzes the identified regions of interest by obtaining the color channel values (e.g., RGB values) for each pixel in each identified region of interest. Also in this operation, the calibration module computes the median value for the obtained values in each color channel. The calibration module stores the computed median values, by identified region of interest, in an array for each color channel. To lessen the effect of noise upon these operations, the calibration module might optionally apply a median filter to the capture of the exposure image prior to performance of the operations. In an alternative example embodiment, the calibration module might optionally apply a median filter solely to each of the identified regions of interest as an initial step in operation 601.

In the process's next operation 602, the calibration module computes a measurement set by sorting the array for each color channel to identify a minimum of the medians across all of the identified regions, a maximum of the medians across all the identified regions, and a median of the medians across all of the identified regions. The calibration module also computes an average (e.g., arithmetic mean) of medians across all of the identified regions (e.g., a running sum of the medians divided by the number of identified regions) for each color channel. In an alternative example embodiment, the calibration module might sort the computed median values as it stores each of them in an array for a color channel in operation 601, rather than sorting the array once the array is complete.

Then in operation 603, the calibration module evaluates the measurement set using an evaluation function that takes as its input one or more statistics (e.g., minimum of the medians, maximum of the medians, median of the medians, and/or average of the medians) in the measurement set to determine whether the current exposure attributes are satisfactory for the calibration images in the calibration process selected by the user. For example, if the captured exposure image consists of an area of red color, the calibration module might use an evaluation function that includes conditional expressions as detailed below. The conditional expressions operate on the statistics contained in the array for the red color channel, where the values in that array can range from 0 to 255 when each color channel is represented by 8 bits:

```
if (max < 240) then
    increase exposure,
else if (min < 128) then
    increase exposure
else if (max > 250) then
    decrease exposure
else
    exposure found
```

It will be appreciated that these conditional expressions attempt to detect when a current exposure setting has produced a minimum for the red color channel that is above a low threshold (e.g., 128) and a maximum for the red color channel within a bounded range (e.g., between 240 and 250) or if a change to the current exposure is required. In terms of luminance, these conditional expressions attempt to detect when exposure attributes are such that dim pixels in the red color channel are exposed sufficiently to be detected by a viewer and bright pixels in the red color channel are not significantly overexposed unless required to allow a viewer to detect the dim pixels in the red color channel. If these conditional expressions determine that measurements are correct (indicating satisfactory exposure), the calibration module accepts the current exposure attributes and creates final exposure settings (e.g., aperture, shutter speed, and/or ISO setting) based on the current exposure attributes and stores the final exposure settings for subsequent use with the selected calibration process for the exposure image. If these conditional expressions determine that measurement are inadequate (indicating poor exposure), the calibration module might (1) increase or decrease the current exposure setting by adjusting (e.g., with software) one or more exposure attributes using the available exposure settings and repeating the capture process (e.g. return to operation 507 with a loop expression not shown above), 2) adopt default values for the exposure attributes, or (3) report failure.

In an alternative example embodiment, the descriptive statistics might be other than those described above. For example, the calibration module might use a measure of central tendency other than median or arithmetic mean in operations 602 and 603. Or the calibration module might use a measure of central tendency in combination with a measure of dispersion (e.g., standard deviation) in these operations or a measure of central tendency in combination with a measure of skewness.

Figure 7:
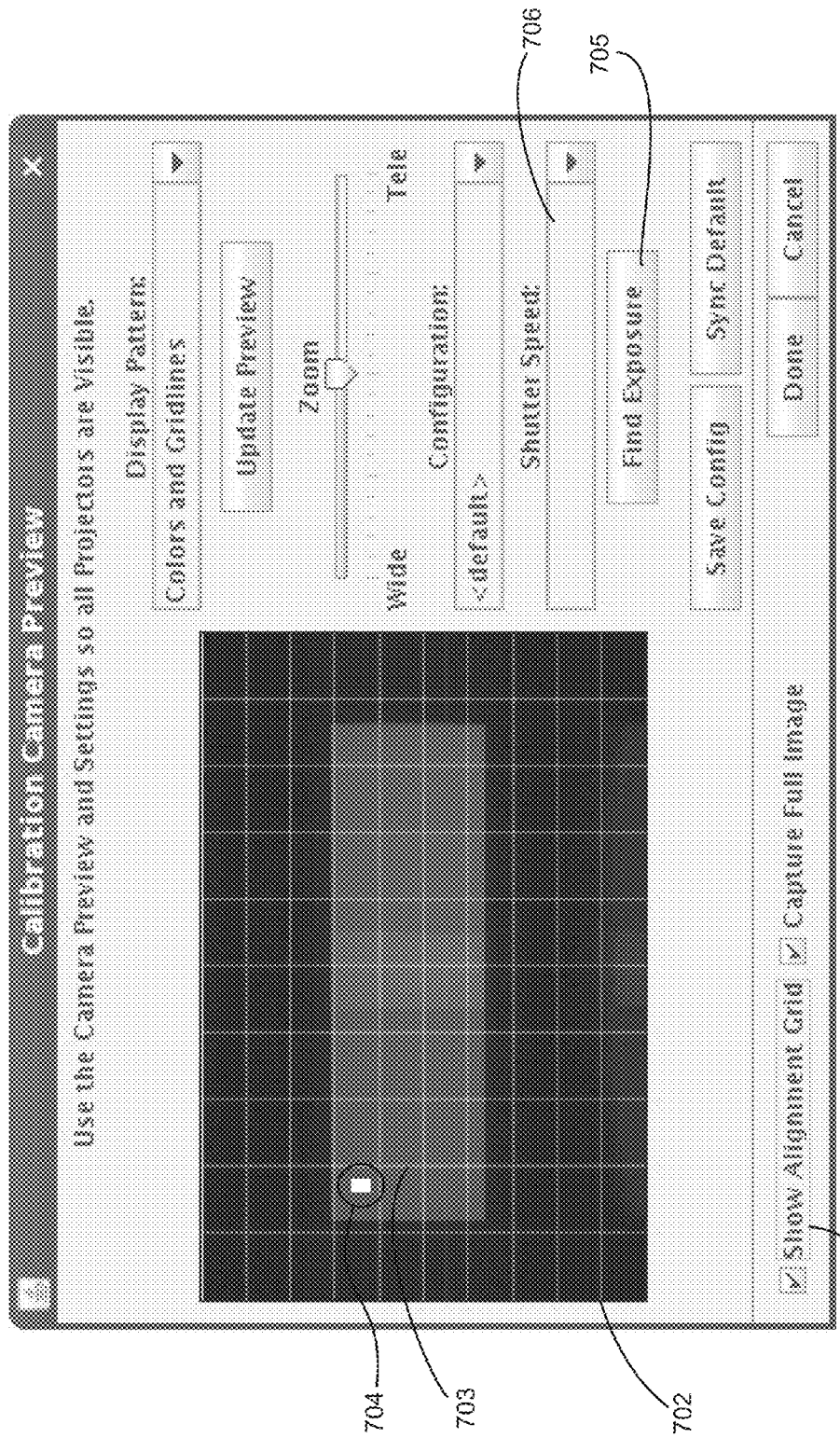
FIG. 7 is a diagram showing a GUI dialog which might be used for identifying the regions of interest in a capture of an exposure image, in accordance with an example embodiment.

FIG. 7 is a diagram showing a GUI dialog which might be used for identifying the regions of interest in a capture of an exposure image, in accordance with an example embodiment. As depicted in FIG. 7, GUI dialog 701 includes captured preview image 702, which has been overlaid with an alignment grid having grid lines such as grid line 703 that serve as a visual aid to the user in identifying region of interests, such as region of interest 704. In an example embodiment, the candidate regions of interest are uniformly-sized according to a divisor of the cell dimensions of the alignment grid. However, any other suitable method of obtaining such regions might be substituted.

A user might identify region of interest 704 by pointing at it with a cursor and clicking a mouse, in an example embodiment. In an alternative example embodiment, the identification of the regions of interest might be automated, e.g., to detect local maximums and local minimums with respect to luminance in the captured preview image 702.

GUI dialog 701 includes a dropdown list 706 labeled "Shutter Speed", which might allow the user to set an initial shutter speed for a digital camera, using software. In an alternative example embodiment, a similar dropdown list might allow a user to set an initial aperture or ISO setting for a digital camera, using software. GUI dialog 701 also includes a button 705 labeled "Find Exposure" which a user might click to initiate operations 506 to 508 in the process shown in FIG. 5. In an example embodiment, GUI dialog 701 might be displayed by calibration module 201 (e.g., camera exposure module 206) on projector platform 102, as depicted in FIG. 3.

It will be appreciated that a GUI dialog similar to GUI dialog 701 might also be used in operation 502 in the process shown in FIG. 5, involving the display and capture of an image to facilitate manual adjustments to the digital camera by the user. Here again, the GUI dialog 701 might be displayed by the calibration module (e.g., camera exposure module) on the projector platform. At this point in the process, the user might decide to view the image in the dialog without the alignment grid. In this regard, see checkbox 707 ("Show Alignment Grid") in GUI dialog 701 in FIG. 7.

Any of the operations described herein that form part of the inventions are useful machine operations. The inventions also relate to a device or an apparatus for performing these operations. The apparatus may be specially constructed for that purpose or it may be a general-purpose computer selectively activated or configured by a computer program stored in the computer. In particular, various general-purpose machines may be used with computer programs written in accordance with the teachings herein or it may be more convenient to construct a more specialized apparatus to perform the operations.

The inventions can also be embodied as computer readable code on a computer readable medium. The computer readable medium is any data storage device that can store data which can thereafter be read by a computer system. Examples of the computer readable medium include hard drives, network attached storage (NAS), read-only memory, random-access memory, CD-ROMs, CD-Rs, CD-RWs, magnetic tapes, and other optical and non-optical data storage devices. The computer readable medium can also be distributed over a network-coupled computer system so that the computer readable code is stored and executed in a distributed fashion.

It will be further appreciated that the instructions represented by the operations in the above figures are not required to be performed in the order illustrated and that all of the processing represented by the operations might not be necessary to practice the inventions. Further, the processes described in any of the above figures can also be implemented in software stored in any one of or combinations of the RAM, the ROM, or the hard disk drive.

Although the foregoing inventions have been described in some detail for purposes of clarity of understanding, it will be apparent that certain changes and modifications can be practiced within the scope of the appended claims. In this regard, it will be appreciated that there are many other possible orderings of the operations in the processes described above and many possible modularizations of those orderings. Accordingly, the present embodiments are to be considered as illustrative and not restrictive, and the invention is not to be limited to the details given herein, but may be modified within the scope and equivalents of the appended claims. In the appended claims, elements and/or operations do not imply any particular order of operation, unless explicitly stated in the claims or implicitly required by the disclosure.

What is claimed is:

1. A method, comprising:
    capturing a projection of a preview image on a surface with a capturing device;
    receiving input identifying one or more regions of interest in the captured preview image;
    projecting an exposure image onto the surface, wherein the exposure image is related to a calibration process and contains at least one of a red, green or blue color;
    computing a configuration of exposure attributes for the capture device by iteratively (a) capturing the projection of the exposure image with the capture device using a configuration of exposure attributes, (b) measuring one or more descriptive statistics relating to pixels in regions of interest in the capture of the exposure image that correspond to the identified regions of interest in the capture of the preview image; (c) evaluating the one or more descriptive statistics with an evaluation function determined by the calibration process, and (d) establishing a revised configuration of exposure attributes for the capture device; and
    storing exposure settings based on the configuration of exposure attributes, wherein each operation of the method is executed by a processor.

2. The method of claim 1, wherein the descriptive statistics relate to one or more color channels in the pixels in the regions of interest in the capture of the exposure image that correspond to the identified regions of interest in the capture of the preview image.

3. The method of claim 1, wherein the exposure attributes include one or more attributes selected from the group consisting of shutter speed, aperture, and International Organization for Standardization (ISO) setting.

4. The method of claim 2, wherein the color channels include a red color channel, a green color channel, and a blue color channel.

5. The method of claim 1, wherein the descriptive statistics include one or more statistics selected from the group consisting of minimum of medians, maximum of medians, median of medians, and average of medians.

6. The method of claim 1, wherein the configuration of exposure attributes is an input for a system for creating a display from a plurality of projectors.

7. The method of claim 1, wherein the exposure image is substantially similar to a calibration image in the calibration process.

8. The method of claim 1, wherein the input as to regions of interest is received by a view in a graphical user interface (GUI).

9. The method of claim 1, wherein the regions of interest are substantially a same size.

10. The method of claim 1, further comprising the operations of
    establishing an initial configuration of exposure attributes for the capture device, wherein the initial configuration depends at least in part on one or more user inputs and the user inputs include adjustments selected from the group consisting of adjustments to the digital camera relating to position, orientation, field of view, depth of field, focus, shutter speed, and ISO setting; and
    projecting a preview image onto the surface.

11. The method of claim 1, wherein the measuring of the one or more descriptive statistics includes the application of a median filter to each pixel in a region of interest in the capture of the exposure image.

12. A non-transitory medium or media containing instructions, which when executed by one or more processors, are operable to:
    establish a first configuration of exposure attributes for a digital camera;
    project a preview image onto a surface;
    capture the projection of the preview image with the digital camera;
    receive input identifying one or more regions of interest in the capture of the preview image;
    project an exposure image onto the surface, wherein the exposure image is related to a calibration process and contains at least one of a red, green or blue color;
    compute a second configuration of exposure attributes for the digital camera by iteratively (a) capturing the projection of the exposure image with the digital camera using a configuration of exposure attributes, (b) measuring one or more descriptive statistics relating to pixels in regions of interest in the capture of the exposure image that correspond to the identified regions of interest in the capture of the preview image; (c) evaluating the one or more descriptive statistics with an evaluation function determined by the calibration process, and (d) establishing a revised configuration of exposure attributes for the digital camera; and
    store exposure settings based on the second configuration of exposure attributes.

13. The non-transitory medium or media of claim 12, wherein the descriptive statistics relate to one or more color channels in the pixels in the regions of interest in the capture of the exposure image that correspond to the identified regions of interest in the capture of the preview image.

14. The non-transitory medium or media of claim 12, wherein the exposure attributes include one or more attributes selected from the group consisting of shutter speed, aperture, and International Organization for Standardization (ISO) setting.

15. The non-transitory medium or media of claim 12, wherein the final configuration of exposure attributes is an input for a system for creating a relatively seamless display from a plurality of projectors.

16. The non-transitory medium or media of claim 12, wherein the input as to regions of interest comes from a user.

17. A method, comprising:
    (a) displaying an image of a calibration process onto a surface from multiple projection devices wherein the image contains at least one of red, green or blue color;
    (b) capturing the image on the surface with a capture device having initial exposure settings;
    (c) calculating a median value for each color channel in an identified region of interest, wherein the median value becomes an input for an evaluation function that determines whether the exposure settings are satisfactory for the calibration process; and repeating (a)-(c) for additional images, each containing at least one of a red, green or blue color.

18. The method of claim 17, wherein the color channel is one of a red color channel, a green color channel, or a blue color channel.

19. The method of claim 17, wherein the exposure settings include one or more settings selected from the group consisting of shutter speed, aperture, and International Organization for Standardization (ISO) setting.

20. The method of claim 17, further comprising an operation of adjusting the exposure settings, if the exposure settings are determined to be unsatisfactory.

21. The method of claim 17, further comprising an operation of persistently storing the exposure settings, if the exposure settings are determined to be satisfactory.

* * * * *